Patented Jan. 29, 1929.

1,700,691

UNITED STATES PATENT OFFICE.

ELMER H. STUART, OF INDIANAPOLIS, INDIANA, ASSIGNOR TO ELI LILLY AND COMPANY, OF INDIANAPOLIS, INDIANA, A CORPORATION OF INDIANA.

OPTIC-NERVE AND RETINA EXTRACT AND PROCESS OF MAKING IT.

No Drawing. Application filed March 8, 1927. Serial No. 173,788.

It is the object of my invention to produce an effective extract of the optic nerve and/or retina, effective in the prevention and treatment of diseases of the optic nerve and/or retina; and an effective process of making such extract.

So far as I am aware, no one prior to me has prepared from the retina and/or optic nerve of animals an extract which is suitable for the treatment of diseases of the human optic nerve and retina, regardless of how such extract is obtained. My extract is such an extract, which can be used hypodermically for treating such diseases, such as atrophy of the optic nerve and retinitis; and is indicated for such use to repair retinal lesions due to inflammation processes, hemorrhage, or trauma, to rejuvenate retinal tissue in condition of senile degeneration, to treat inflammatory processes involving the optic nerve, and to rejuvenate the optic nerve in beginning cases of atrophy and to arrest such atrophy even in later stages. This extract has been used in a number of cases, and is found to be effective, and to be safely and conveniently usuable. It is relatively free from deleterious substances, so that it can be given hypodermically with little or no danger of producing shock or of causing inflammation or induration at the site of injection. It is a clear solution, because it contains very little solid matter; and on boiling it remains clear. Further, the nitrogen-content is quite low in proportion to the amount required to produce a given therapeutic effect, and this is probably a large factor in the production of the other advantages noted above. Because of these various things, my extract is sufficiently free from injurious substances for repeated hypodermic administration.

In carrying out my invention, fundamentally, I use the retinas and/or optic nerves of the eyes of animals, conveniently those of hogs or cattle. While I can use the optic nerves alone, or the retinas alone, to produce extracts more specific for diseases of the optic nerve and of the retina respectively, yet the retina and optic nerve are so closely allied that I prefer to make a combined extract. I carefully remove the retinas from the eyes, with so much of the optic nerve as was obtained with them; for ordinarily it is difficult to obtain the entire optic nerves, and I find that a portion of the optic nerve is sufficient to get a suitable proportion of the optic-nerve and retina substances. I extract these removed retinas and/or optic nerves with a suitable solvent, such as alcohol, acetone, acidulated water, or even plain water; of which I prefer alcohol, conveniently ethyl alcohol. Assuming fairly concentrated alcohol as the solvent after the extraction has been made and the extract filtered, I evaporate off the alcohol, with or without adding water; and thus get an aqueous solution of a substance which is also soluble in fairly concentrated alcohol.

In practice, I prefer to make several extractions of the retinas and optic nerves with alcohol; desirably grinding the retinas and optic nerves before the extractions, and desirably making the earlier extractions cold and at least one with the alcohol heated to or nearly to boiling. I mix the various extracts together, and filter; and then evaporate this mixture of the extracts, preferably under vacuum, to reduce the volume, desirably to a point where the solution begins to foam, add an amount of distilled water equal to about one-fourth of the original total extracting alcohol used, and continue the evaporation until the total volume has been reduced to about the volume of the added distilled water, thus getting rid of practically all the alcohol. The resultant solution is desiraby defatted, as by being extracted with gasoline or other suitable solvent several times; filtered; and further evaporated, desirably under vacuum, to remove the gasoline, and to reduce the volume to about one-sixth of the total volume of the original extracting alcohol. The solution now remaining is suitably filtered, as through a talc pad, to obtain a clear liquid. A preservative may be added, if desired or necessary.

The final solution thus obtained is the potent and purified optic nerve and retina extract embodying my invention.

My purified extract contains less than 2½% total solids, and usually of the order of 1.5% to 2.0% total solids. It contains less than 0.25% residual nitrogen, and usually of the order of 0.075% to 0.125% residual nitrogen. It represents much more than one gram per c. c., and usually about two grams per c. c., of the optic nerve and retina material. It is sufficiently concentrated so that it may be injected in relatively small amounts and yet be effective. In all the cases in which it has so far been used, it has not produced shock and has not caused inflammation or induration at the site of injection. My solution is clear, so that there is little or no danger of mechanical interference from suspended solids, as well as little or no danger of shock or of protein sensitization. Further, it remains clear even on boiling.

One example of a specific preparation of an optic nerve and retina extract in accordance with my invention is as follows:

The retinas and the appendant portions of the optic nerves are removed from about 160 pounds of beef eyes, which gives a weight of retinas and optic nerves of about 3.25 pounds. This removed material is desirably ground through a meat grinder. To these removed retinas and optic nerves is added about 1500 c. c. of alcohol, desirably ethyl alcohol; which may be suitably denatured. This is thoroughly stirred for some minutes, and allowed to stand in the refrigerator for several hours, desirably overnight. Then the solid material of the retinas and optic nerves is strained off, but the supernatant liquid is preserved. The same material is again extracted with about 1500 c. c. of alcohol, stirred, allowed to stand overnight, and the solid material again strained off and the supernatant liquid preserved. The two extractions just described are desirably cold extractions, at about ordinary room temperature. A third extraction then is made of the same optic nerve and retina material with another 1500 c. c. of alcohol, but during this extraction the mixture of alcohol and solid material is heated on a water bath to or nearly to boiling, and then allowed to cool for several hours, until substantially room temperature is reached. Then the solid residue of the optic nerves and retinas is strained off for the third time, and the supernatant liquid again preserved. The liquid remaining from the three extractions is then mixed together, and filtered to remove any suspended solids.

The mixture of the three extracts is evaporated under vacuum until it begins to foam. Then about 1200 c. c. of distilled water is added, and the evaporation under vacuum is continued until the total volume has been reduced to about 1100 and 1200 c. c.

This liquid is now extracted with gasoline, conveniently about three times, using about a pint of gasoline per extraction. The gasoline serves to remove any fats which may be present. After the final gasoline extraction, the solution is filtered, and returned to the vacuum still for further evaporation under vacuum, to remove any remaining gasoline and to reduce the volume to about 750 c. c. This liquid is cooled to about 3° C. for several hours, conveniently overnight; and then filtered, as through a talc pad, to remove any solids which may possibly remain in suspension. Each c. c. of this final solution represents about two grams of the original retina and optic nerve material.

This final solution is the optic nerve and retina extract embodying my invention. It may be filled into vials or ampoules of convenient size, and may be kept without material loss of potency for at least several months. It has been kept for over six months without appreciable loss of potency.

This final extract has been successfully used in treating and arresting diseases of the retina and optic nerve, such as those noted above.

I claim as my invention:

1. The process of preparing an optic nerve and/or retina extract, which consists in extracting optic nerves and/or retinas of the eyes of animals with alcohol, repeating the extraction several times with separate quantities of alcohol, mixing the several extracts together, evaporating the combined extracts and adding water to convert the alcohol solution into a water solution, and separating and preserving the clear liquid.

2. The process of preparing an optic nerve and/or retina extract, which consists in extracting optic nerves and/or retinas of the eyes of animals with alcohol, evaporating the extract and adding water to convert the alcohol solution into a water solution, and separating and preserving the clear liquid.

3. The process of preparing an optic nerve and/or retina extract, which consists in extracting optic nerves and/or retinas of the eyes of animals with alcohol, repeating the extraction several times with separate quantities of alcohol, mixing the several extracts together, evaporating the combined extracts to convert the alcohol solution into a water solution, and separating and preserving the clear liquid.

4. The process of preparing an optic nerve and/or retina extract, which consists in extracting optic nerves and/or retinas of the eyes of animals with alcohol, evaporating the extract to convert the alcohol solution into a water solution, and separating and preserving the clear liquid.

5. The process of preparing an optic nerve and/or retina extract, which consists in extracting optic nerves and/or retinas of the eyes of animals with alcohol, evaporating the extract to convert the alcohol solution into a water solution, extracting with a suitable hydro-carbon solvent, evaporating further, and separating and preserving the clear liquid.

6. The process of preparing an optic nerve and/or retina extract, which consists in extracting optic nerves and/or retinas of the eyes of animals with alcohol, evaporating the extracts to convert the alcohol solution into a water solution, extracting with a suitable hydro-carbon solvent several times, evaporating further, and separating and preserving the clear liquid.

7. The process of preparing an optic nerve and/or retina extract, which consists in extracting optic nerves and/or retinas of the eyes of animals with alcohol, repeating the extraction several times with separate quantities of alcohol at different temperatures, mixing the several extracts together, evaporating the combined extracts to drive off the alcohol, and separating and preserving the clear liquid remaining.

8. The process of preparing an optic nerve and/or retina extract, which consists in extracting optic nerves and/or retinas of the eyes of animals with alcohol, repeating the extraction several times with separate quantities of alcohol, the first extraction being cold and a later one being with the alcohol heated to or nearly to boiling, mixing the several extracts together, evaporating the combined extracts to drive off the alcohol, and separating and preserving the clear liquid remaining.

9. The process of preparing an optic nerve and/or retina extract, comprising making an extract of such substance with one of the solvents water and alcohol, filtering, and treating the solution to make it a solution of the other of said solvents, to produce a final substance soluble both in water and in alcohol.

10. An optic nerve and/or retina extract, comprising a potent extract made from optic nerves and/or retinas of the eyes of animals and effective in treating and arresting certain diseases of the human optic nerve and/or retina, said extract containing less than 2.5% total solids.

11. An optic nerve and/or retina extract, comprising a potent extract made from optic nerves and/or retinas of the eyes of animals and effective in treating and arresting certain diseases of the human optic nerve and/or retina, said extract containing total solids of the order of 1.5% to 2.0%.

12. An optic nerve and/or retina extract, comprising a potent extract made from optic nerves and/or retinas of the eyes of animals and effective in treating and arresting certain diseases of the human optic nerve and/or retina, said extract containing less than 0.25% residual nitrogen.

13. An optic nerve and/or retina extract, comprising a potent extract made from optic nerves and/or retinas of the eyes of animals and effective in treating and arresting certain diseases of the human optic nerve and/or retina, said extract containing residual nitrogen of the order of 0.075% to 0.125%.

14. An optic nerve and/or retina extract, comprising a potent extract made from optic nerves and/or retinas of the eyes of animals and effective in treating and arresting certain diseases of the human optic nerve and/or retina, said extract representing more than one gram of optic nerve and/or retina per c. c.

15. An optic nerve and/or retina extract, comprising a potent extract made from optic nerves and/or retinas of the eyes of animals and effective in treating and arresting certain diseases of the human optic nerve and/or retina, said extract being in the form of a clear solution.

16. An optic nerve and/or retina extract, comprising a potent extract made from optic nerves and/or retinas of the eyes of animals and effective in treating and arresting certain dieases of the human optic nerve and/or retina, said extract being in the form of a clear solution which on boiling remains clear and retains its potency.

17. An optic nerve and/or retina extract, comprising a potent extract made from optic nerves and/or retinas of the eyes of animals and effective in treating and arresting certain diseases of the human optic nerve and/or retina, said extract being capable when parenterally administered of producing beneficial results in such diseases and being sufficiently free from injurious substances for repeated administration.

In witness whereof I, ELMER H. STUART, have hereunto set my hand at Indianapolis, Marion County, Indiana, this 5th day of March, A. D. one thousand nine hundred and twenty-seven.

ELMER H. STUART.